US011904627B1

(12) United States Patent
Davis

(10) Patent No.: US 11,904,627 B1
(45) Date of Patent: Feb. 20, 2024

(54) PAINTBRUSH GUARD

(71) Applicant: Jarran C. Davis, Tulsa, OK (US)

(72) Inventor: Jarran C. Davis, Tulsa, OK (US)

( * ) Notice: Subject to any disclaimer, the term of this patent is extended or adjusted under 35 U.S.C. 154(b) by 429 days.

(21) Appl. No.: 16/951,098

(22) Filed: Nov. 18, 2020

Related U.S. Application Data

(60) Provisional application No. 62/985,377, filed on Mar. 5, 2020.

(51) Int. Cl.
*B44D 3/12* (2006.01)
*B44D 3/22* (2006.01)
*A46B 17/06* (2006.01)

(52) U.S. Cl.
CPC .............. *B44D 3/123* (2013.01); *A46B 17/06* (2013.01); *B44D 3/225* (2013.01)

(58) Field of Classification Search
CPC ......... A46B 17/04; B44D 3/123; B44D 3/225
USPC ............................................................ 15/246
See application file for complete search history.

(56) References Cited

U.S. PATENT DOCUMENTS 2,078,193 A 4/1937 Milligan
2,820,237 A 1/1958 Maslaney
5,678,276 A * 10/1997 Ledingham .............. A46B 3/12 15/177
6,163,920 A 12/2000 Meyer
6,199,694 B1 * 3/2001 Van Diest .............. A46B 17/04 220/4.24
10,463,145 B2 8/2019 Pittes et al.
2003/0135945 A1 * 7/2003 Nordstrom ............. A46B 17/04 206/362.4
2015/0223593 A1 8/2015 Sguera
2015/0374113 A1 12/2015 Walker
2017/0238695 A1 * 8/2017 Morgan ................. B44D 3/125
2019/0246785 A1 * 8/2019 Pittes ....................... A46B 3/12

FOREIGN PATENT DOCUMENTS

WO WO-2019054884 A1 * 3/2019

* cited by examiner

*Primary Examiner* — Laura C Guidotti
*Assistant Examiner* — Aaron R McConnell
(74) *Attorney, Agent, or Firm* — Chad Hinrichs

(57) ABSTRACT

A paintbrush guard a hollow body sized to fit over a felt of a paintbrush, a pair of opposing side shields and end shields extending from the body, the side shields having a plurality of interlocking tabs which can be used to lock the shields in an open bell shaped position or a closed position for cutting in a painted surface. The paintbrush guard may also be equipped with a downward facing hook extending from an end shield to hold the guard and paintbrush on the side of a paint container. Further the paintbrush guard maybe equipped with a comb on the side of the guard for use in cleaning a paintbrush.

9 Claims, 7 Drawing Sheets

PAINTBRUSH GUARD

PRIORITY CLAIM

The present application claims priority to and is a continuation-in-part of U.S. Provisional Patent Application No. 62/985,377 filed on Mar. 5, 2020 entitled Paintbrush Guard which is incorporated by reference.

FIELD OF THE INVENTION

The present invention relates generally to paintbrush accessories. More particularly, the present invention relates to a device to use when painting along an edge and cover the brush while storing.

BACKGROUND OF THE INVENTION

One of the most time consuming and messy parts of painting is edging or painting along the outer edge of the wall being painted. This is typically along a floor, window, door or ceiling and their related trim or crown molding. The goal is to obtain a crisp straight line where the color changes along this change in surfaces. Traditionally this has been done by taping off the already painted opposing surface and then painting up to and slightly onto the tape. Once the paint is applied the tape is removed. While this typically provides acceptable results, it is a time consuming process of applying the tape prior to painting.

There are various products on the market to avoid the use of tape while edging. These are typically specially shaped paint applicators or pads as well as shields to protect the already painted opposing surface. While these devices may initially provide a straight crisp line, they quickly become over saturated with paint and need to be cleaned in order to continue achieving acceptable results.

What is needed, therefore, is a device that can be used with a standard paintbrush to obtain crisp straight lines while edging without taping.

BRIEF SUMMARY OF THE INVENTION

The present invention is a paintbrush guard which slides over and surrounds a paintbrush. It has a hollow body sized to fit over a felt of a paintbrush and a skirt which extends over the bristles of the brush. The skirt is comprised of a pair of opposing side shields and end shields extending from the body. The side shields and end shields have a plurality of interlocking tabs which can be used to lock the shields in an open bell shaped position. This allows the guard to hold a paintbrush in an upright or near vertical position.

The end shields have a plurality of openings which interlock with the tabs on the side shields to cause the side shields to taper towards one another in a closed position. The closed position can be used to cut in a painted surface.

The paintbrush guard may also be equipped with a downward facing hook extending from the body or an end shield to hold the guard and paintbrush on the side of a paint container. Further the paintbrush guard maybe equipped with a comb on the side of the guard for use in cleaning a paintbrush.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
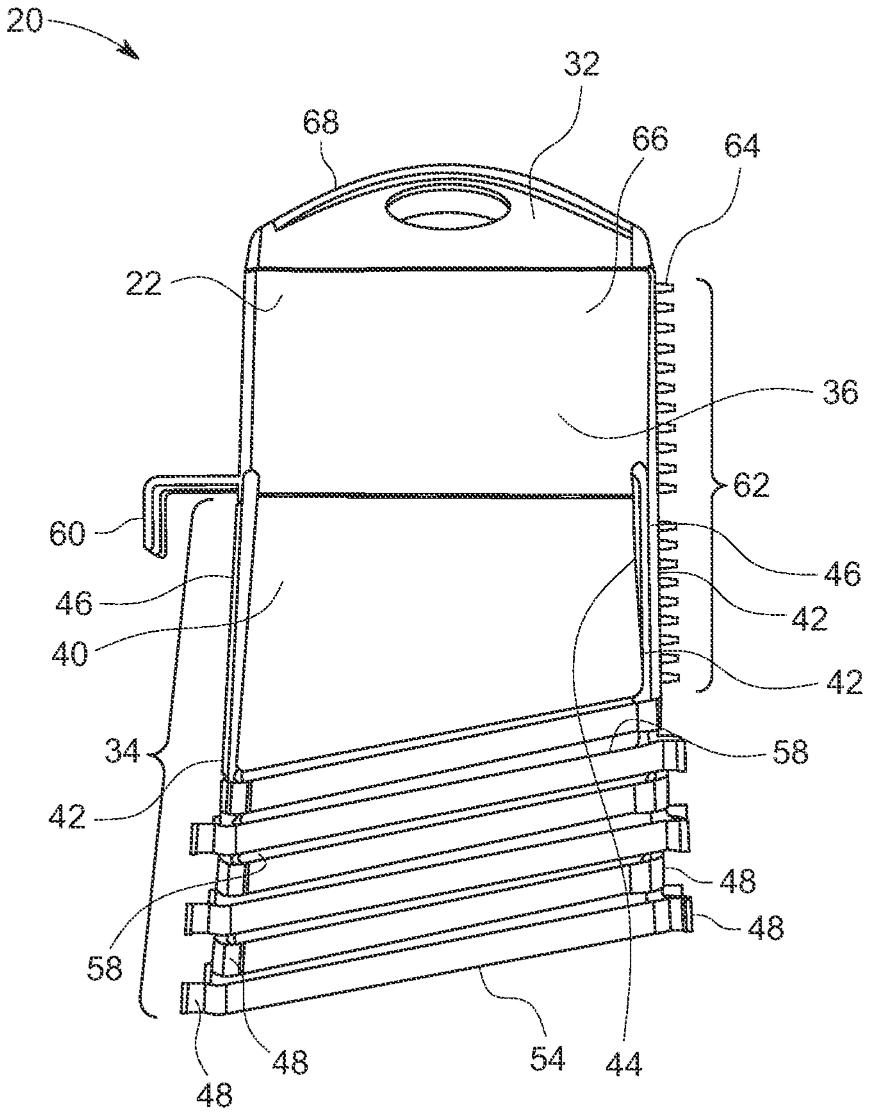
FIG. 1 is a side view of the preferred embodiment of the brush guard of the present invention.

Turning now to the drawings, FIG. 1 is a perspective view of the brush guard 20 without a brush. It has a hollow rectangular body 22 which is sized to slide over the felt 24 of a paintbrush 26 and hold the body 28 of the brush 26 with the handle 30 extending out the top 32 of the guard 20. A skirt 34 extends from the bottom 36 of the body and extends over the bristles 38 of the brush 26.

Figure 2:
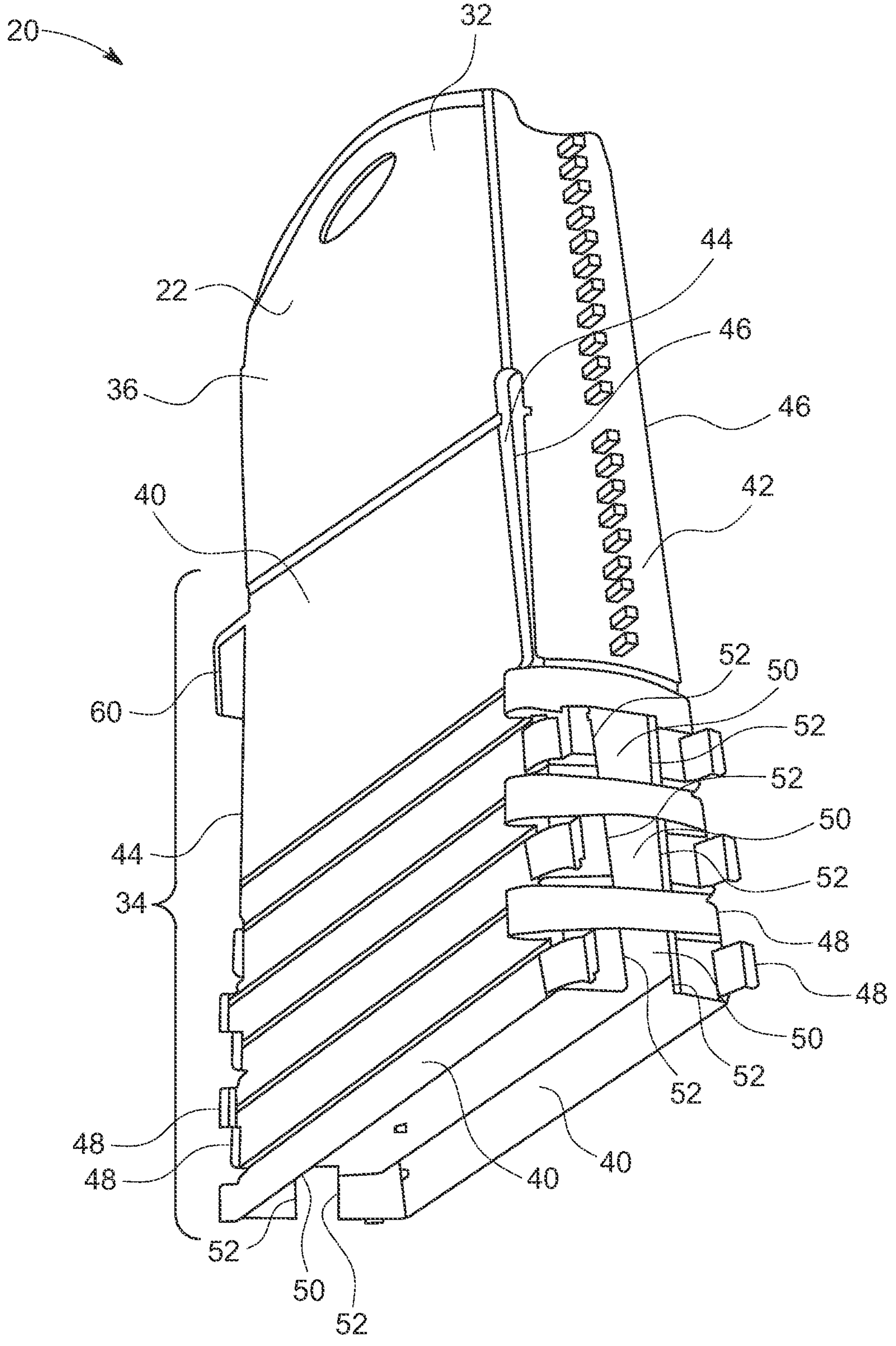
FIG. 2 is a perspective view of the preferred embodiment of the brush guard of the present invention with the tabs interlocked in the open position.
Figure 3:
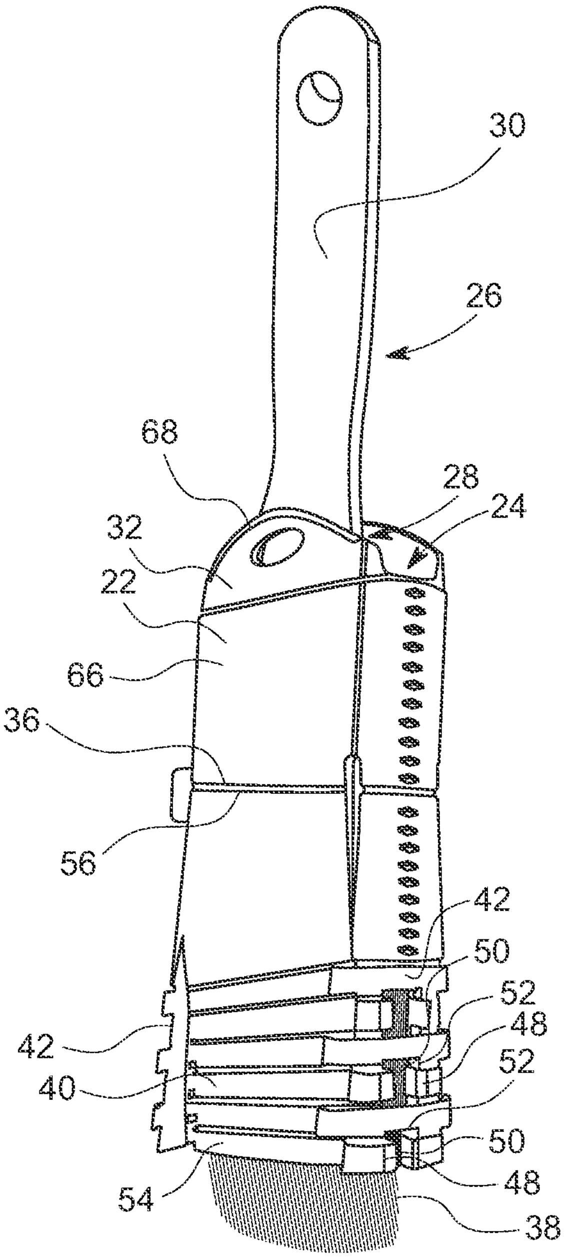
FIG. 3 is a perspective view of the brush guard of the present invention mounted on a paintbrush with the tabs on the side shields interlocked with the openings in the end tabs thus putting the paintbrush guard in the closed position

In the preferred embodiment the skirt 34 is segmented into 4 pieces—a pair of opposing side shields 40 which extend from the bottom 35 of the body 22 over the sides of the bristles 38 and a pair of opposing end shields 42 which extend from the bottom 35 of the body 22 over the opposing ends of the bristles 38. As can be seen in FIGS. 1 and 2 the edges 44 of each side shield are adjacent to one edge 46 of each end shields 42.

Figure 6:
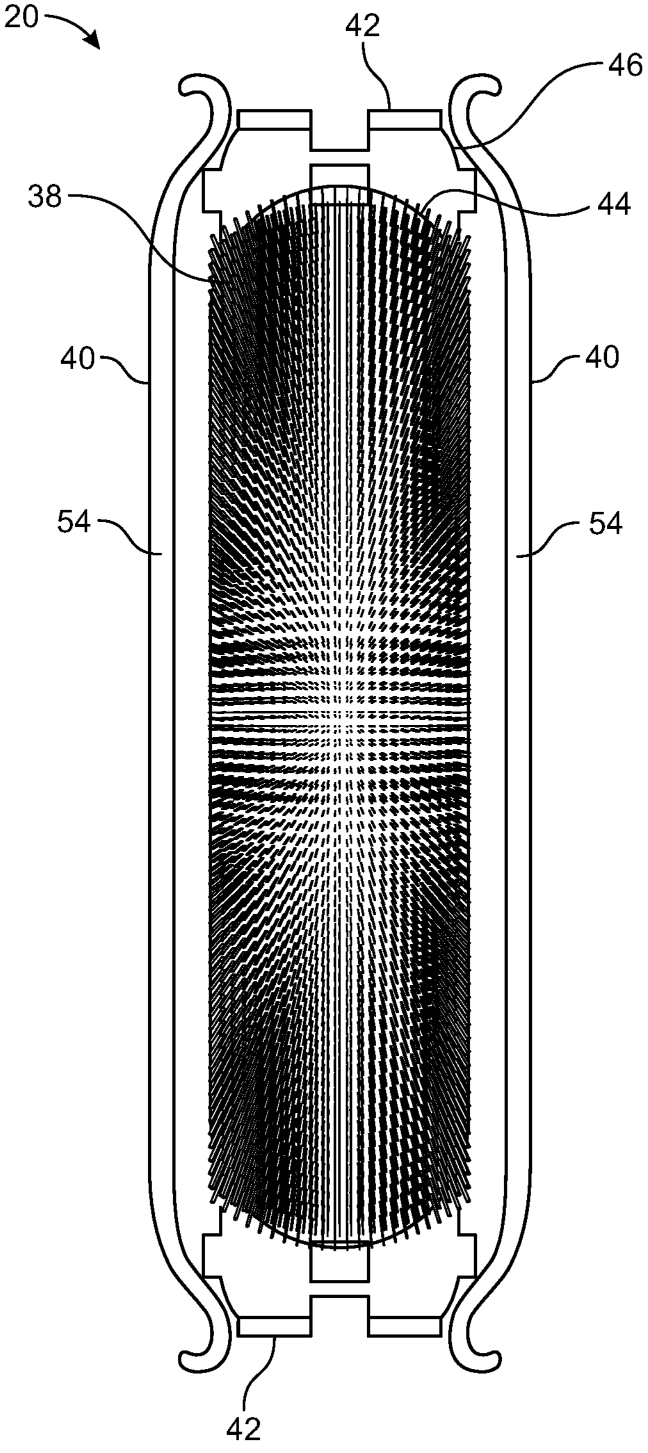
FIG. 6 is a bottom view of the preferred embodiment of the brush guard holding a brush in the open position.

The opposing edges 44 of the side shields 40 and the opposing edges 46 of the end shields 42 have a plurality of tabs 48. The tabs 48 on the edges 44 of the side shields 40 can be placed in an interlocked position with the tabs 48 on the adjacent edges 46 of the end shields 42. When the tabs 48 of the adjacent edges 44 and 46 are interlocked it places the shields 40 and 42 and skirt 34 in a belled rectangular shape or open position. FIG. 6 provides a bottom view of the brush guard in the open position holding a paintbrush 26. That is to say the bottom 54 of the skirt 34 or shields 40 and 42 forms a larger rectangular footprint than the top 56 of the skirt 34 or shields 40 and 42. This allows the paint brush guard 20 to hold a paintbrush 26 in an upright, near vertical position.

The end shields 42 each have one or more openings 50 passing through them. These openings 50 are sized and aligned with the tabs 48 on the adjacent edges 44 of the side shields 40 such that the tabs 48 can be interlocked with the openings 50. The sides 52 of the openings are angled such that when these tabs 48 are interlocked with the openings 50, the side shields 40 taper towards one another. Further, if the brush guard 20 is mounted on a brush 26 and the tabs 48 are placed in an interlocked position with the openings 50 the bristles 38 of the brush 26 are captured in a narrow line which can be used to cut in painting (i.e. painting along the edge or boarder of a surface being painted.

The bottom 54 of the skirt 34 is angled to follow the taper of a paint brush. In the preferred embodiment each of the shields 40 and 42 of the skirt 34 are scored into segments 58. This allows the user to break off segments 58 of the shields 40 and 42 to adjust to various sized brushes 26.

Figure 4:
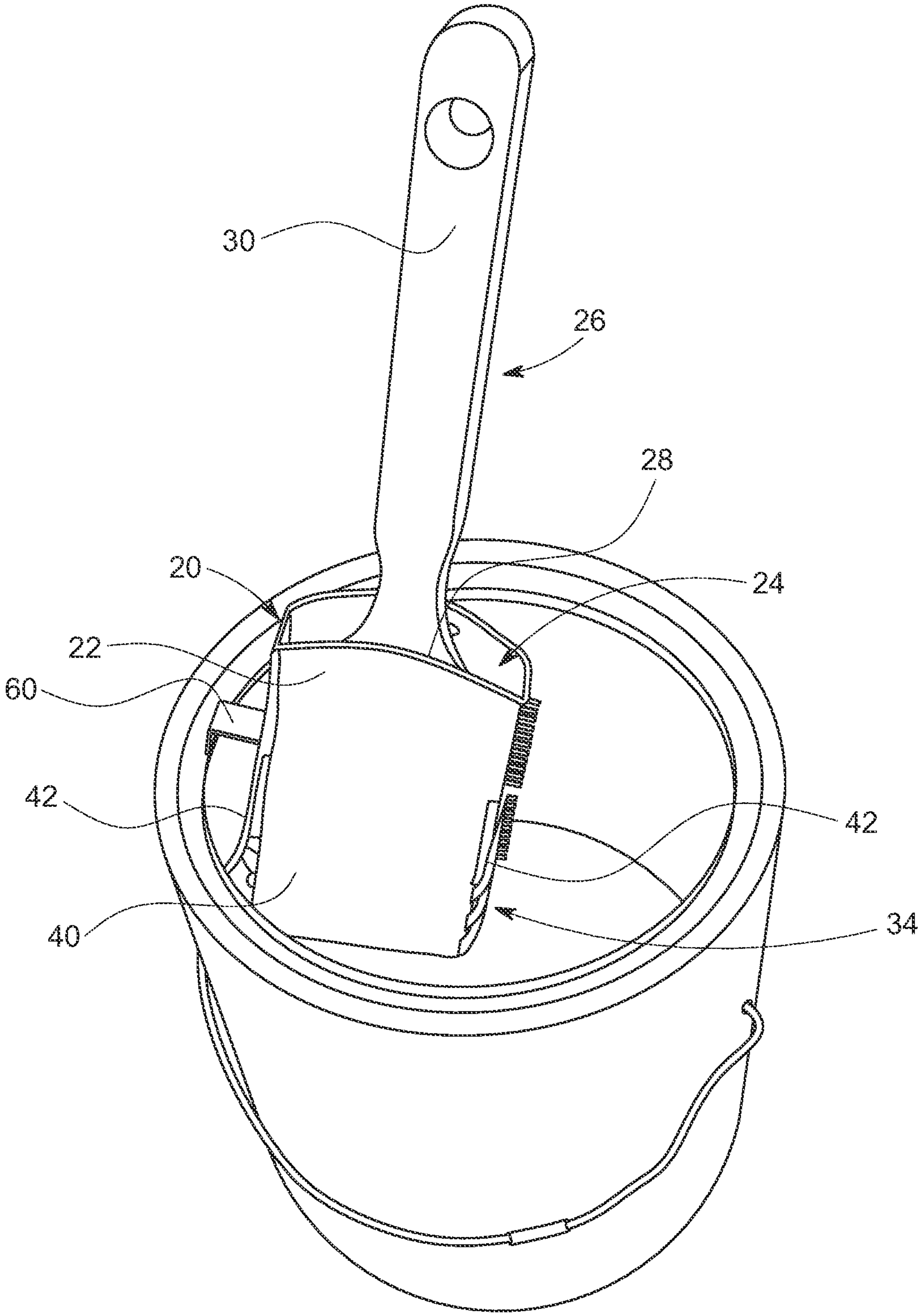
FIG. 4 is a perspective view of the paintbrush guard mounted on a brush and holding that brush inside a paint can.

In the preferred embodiment there is a hook 60 extending from the end of the body 22 of the brush guard 20. The hook 60 is open downwards towards the bottom 54 of the skirt 34. When the brush guard 20 is mounted on a brush 26 the hook 60 can be used to hang the brush 26 inside a paint can as shown in FIG. 4. This can be handy when taking a break or having to set the paintbrush 26 aside to reposition equipment. For a short pause in painting, the brush guard 20 can be positioned on the brush 26 so the bristles 38 are above the paint in the can. If a longer break is anticipated, the brush guard 20 can be positioned on the brush 26 so the bristles 38 are in the paint. This will keep the brush 26 from drying out.

The brush guard 20 may be equipped a comb 62 comprising a plurality of teeth 64 protruding from the end of the body 22 and/or skirt 34 as seen in FIGS. 1 and 2. In the preferred embodiment the comb 62 is located on the exterior end of the brush guard 20 opposite the end with the hook 60. This comb 62 can be used to clean the paintbrush 26. The brush guard 20 is removed from the brush 26 when cleaning the brush 26. While running the brush 26 under water the comb 62 can be used to remove paint from the bristles 38 including dried clumps.

Figure 5:
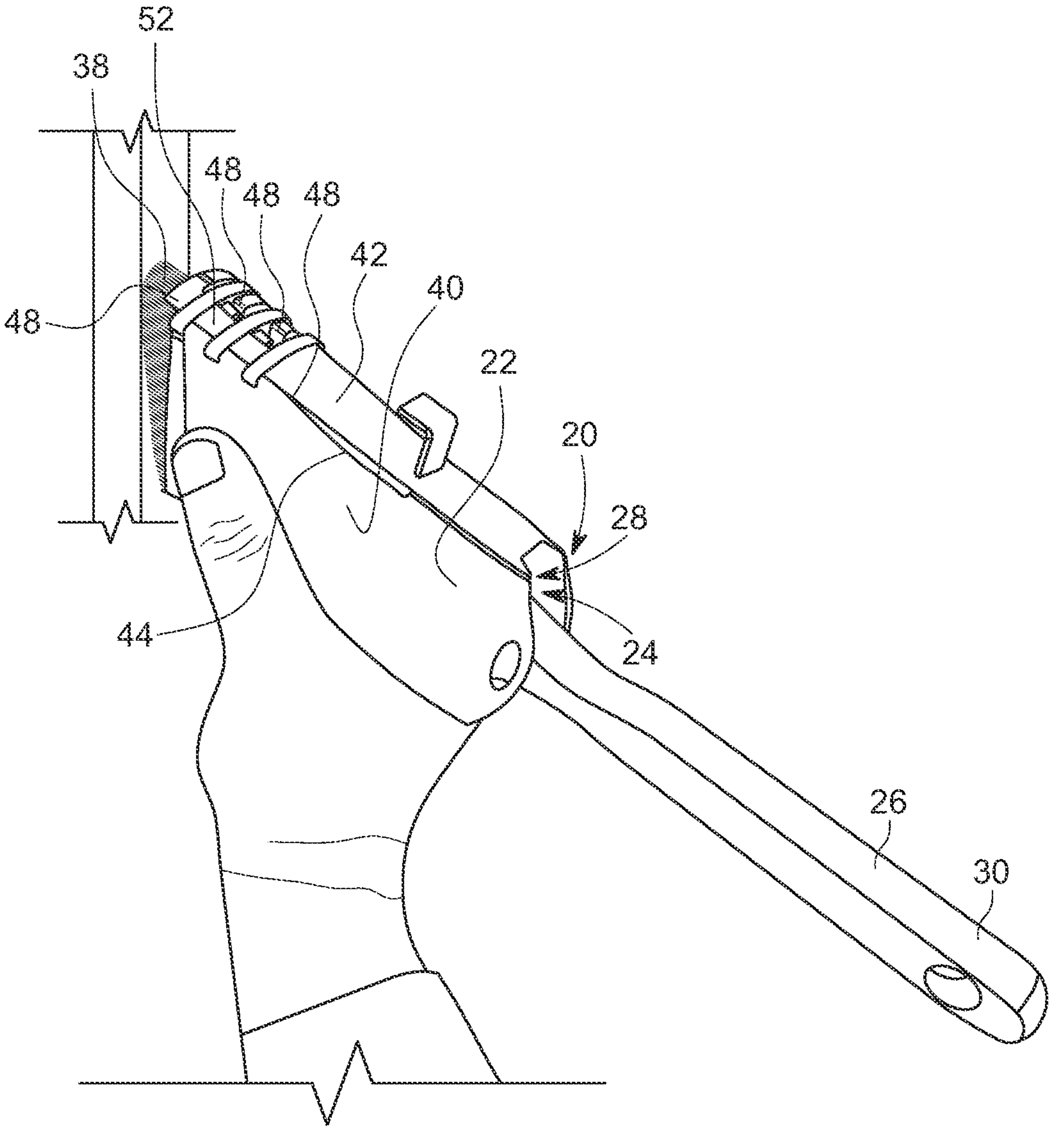
FIG. 5 is a perspective view of the preferred embodiment of the brush guard in use cutting in a painted surface.
Figure 7:
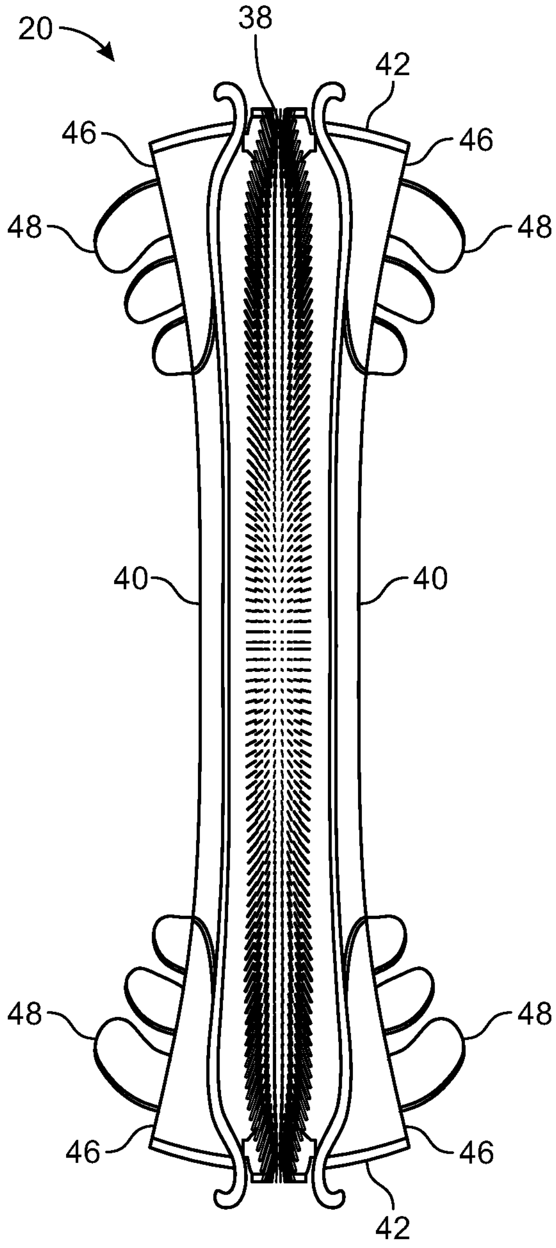
FIG. 7 is a bottom view of the preferred embodiment of the brush guard holding a brush in the closed position.

FIG. 5 shows the paintbrush guard 20 in use on a paint brush 26 while edging along trim. The brush guard 20 is adjusted on the brush 26 so the bristles 38 extend below the bottom 54 of the skirt 34. The tabs 48 on the edges 44 of the side shield 40 are then engaged with the openings 50 of the end shields 42, i.e. in the closed position. FIG. 7 provides a bottom view of the present device 20 in the closed position. This squeezes and holds the bristles 38 in a thin well defined line and allows the user to obtain a crisp straight line of paint along the edge of the surface being painted. The user grasps the paint brush 26 by pressing on the opposing side shields 40.

The brush guard 20 can be retracted up the handle 30 of the paintbrush 26 to reload the brush 26 with paint. Once the brush 26 is loaded the brush guard 20 is slid back down the handle 30 to a point where the skirt 34 covers the majority of the bristles 38 with a small portion of the bristles 38 extending beyond the bottom 54 of the skirt 34.

The body 28 and skirt 34 of the brush guard 20 are sized to fit loosely over the exterior of the paintbrush 26. The sides 66 of the body 28 taper towards near the top 32 of the body 28/brush guard 20. This creates a friction fit between the brush guard 20 and the brush 26 which holds the brush guard 20 in place relative to the brush 26. In the preferred embodiment the interior surfaces of the brush guard 20 are flat. This allows the brush guard to slide over the felt 24 of the brush without getting hung up on edge of the felt 24.

Movement of the brush guard 20 up and down on the brush 26 is aided by a raised exterior ridge 68 extending outward along the top 32 of the body 22 of the brush guard 20. As the user holds the brush 26 and brush guard 20 in their hand, their thumb can engage with this ridge 68 and move the brush guard 20 up or down on the paintbrush 26.

The exact size of the brush guard 20 can vary. It is intended to be sized to fit a variety of standard sized paintbrushes 26. Likewise, the brush guard 20 can be manufactured out of many different materials. However, in the preferred embodiment, it is made of a flexible plastic which allows movement of the skirt 34 relative to the body 28 of the brush guard 20.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A paintbrush guard comprising:

a hollow body sized to fit over a felt of a paintbrush, the body having a top, a bottom, a pair of opposing sides and a pair of opposing ends;

a pair of opposing side shields extending from the bottom of the sides of the body, the side shields having a pair of edges with a plurality of tabs extending from the edges;

a pair of opposing end shields extending from the bottom of the edges of the body, the end shields having a pair of edges with a plurality of tabs extending from the edges;

each end shield having one or more openings sized, shaped and located to interlock with the tabs on the edges of the adjacent side shield;

wherein the tabs on the edges of the shields are located and shaped to interlock with the tabs on the edges of the adjacent shields;

wherein when the tabs are interlocked the paintbrush guard has a bell shape; and wherein when the tabs on the edge of the adjacent side shield are interlocked with the openings on the end shield, the side shields taper towards one another.

2. The paintbrush guard of claim 1 further comprising:

the side shields having a bottom edge which is angled relative to the bottom of the body; and one of the end shields being longer than the other end shield.

3. The paintbrush guard of claim 1 further comprising:

the sides of the body being thicker at the top of the body than at the bottom of the body.

4. The paintbrush guard of claim 1 further comprising:

a hook extending from one of the ends of the body.

5. The paintbrush guard of claim 1 further comprising:

a plurality of teeth extending from one of the ends of the body.

6. The paint brush guard of claim 1 further comprising:

a plurality of scores on the side shields;

wherein the scores provide a guide for even removal of portions of the side shields.

7. The paint brush guard of claim 1 further comprising:

a plurality of scores on the end shields;

wherein the scores provide a guide for even removal of portions of the end shields.

8. A paintbrush guard comprising:

a hollow body sized to fit over a felt of a paintbrush, the body having a top, a bottom, a pair of opposing sides and a pair of opposing ends, the sides of the body being thicker at the top of the body than at the bottom of the body;

a pair of opposing side shields extending from the bottom of the sides of the body, the side shields having a pair of edges with a plurality of tabs extending from the edges, the side shield having a bottom edge which is angled relative to the bottom of the body;

a pair of opposing end shields extending from the bottom of the edges of the body, the end shields having a pair of edges with a plurality of tabs extending from the edges, each end shield having one or more openings sized, shaped and located to interlock with the tabs on the edges of the adjacent side shield and one of the end shield being longer than the other side shield;

a hook extending from one of the sides of the body; and a plurality of scores on the side shields and end shields;

wherein the scores provide a guide for even removal of portions of the shields;

wherein the tabs on the edges of the shields are located and shaped to interlock with the tabs on the edges of the adjacent shield;

wherein when the tabs are interlocked the paintbrush guard has a bell shape; and wherein when the tabs on the edge of the adjacent side shield are interlocked with the openings on the end shields, the side shields taper towards one another.

9. The paintbrush guard of claim 5 further comprising:

a comb formed from the plurality of teeth.

* * * * *